Figure 1:
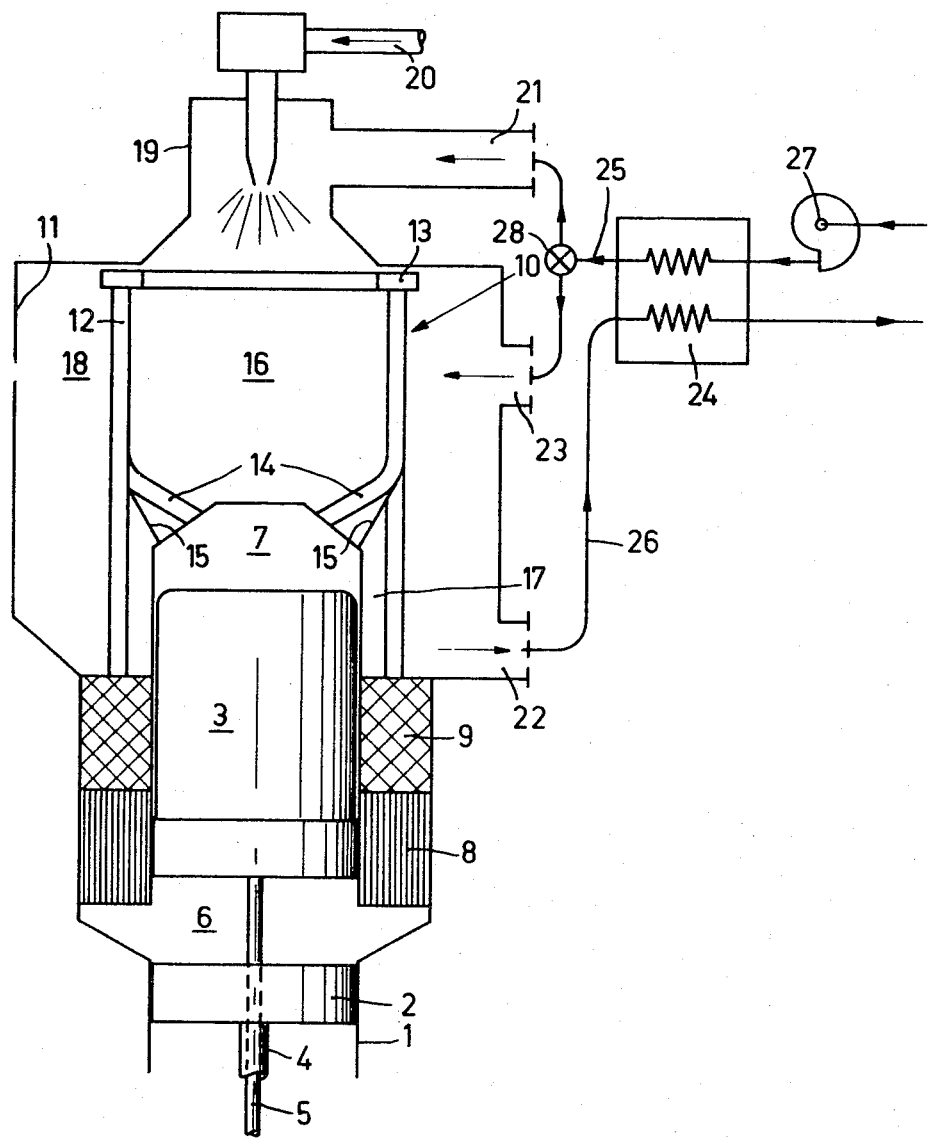

United States Patent [19]
Michels et al.

[11] 3,848,412
[45] Nov. 19, 1974

[54] METHOD OF SUPPLYING THERMAL ENERGY TO THE HEATER OF A HOT-GAS ENGINE, AS WELL AS A HOT-GAS ENGINE COMPRISING A DEVICE FOR CARRYING OUT THE METHOD

[75] Inventors: Albertus Peter Johannes Michels; Henricus Cornelis Johannes Van Beukering; Herman Fokker; Roelf Jan Meijer, all of Emmansingel, Eindhoven, Netherlands

[73] Assignee: U.S. Philips Corporation, New York, N.Y.

[22] Filed: Apr. 8, 1974

[21] Appl. No.: 458,550

Related U.S. Application Data
[63] Continuation of Ser. No. 334,869, Feb. 22, 1973.

[30] Foreign Application Priority Data
Mar. 6, 1970 Netherlands............................ 03200

[52] U.S. Cl..................................... 60/517, 431/10
[51] Int. Cl............................................. F02g 1/04
[58] Field of Search................ 60/517, 526; 431/10

[56] References Cited
UNITED STATES PATENTS

| | | | |
|---|---|---|---|
| 3,048,131 | 8/1962 | Hardgrove | 431/10 |
| 3,421,824 | 1/1969 | Herbst | 431/10 |
| 3,456,438 | 7/1969 | Meijer et al. | 60/517 |

*Primary Examiner*—Irwin C. Cohen
*Assistant Examiner*—Allen M. Ostrager
*Attorney, Agent, or Firm*—Frank R. Trifari

[57] ABSTRACT

A method and apparatus for supplying thermal energy to the heater of a hot-gas engine, whereby a quantity of air of combustion is supplied which is smaller than the quantity which stoichiometrically corresponds to the quantity of fuel supplied to the burner device resulting in incomplete combustion and lower temperature; later additional air is supplied to the combustion gases for complete combustion without further temperature rise such that substantially less nitrogen oxides are produced.

9 Claims, 2 Drawing Figures

METHOD OF SUPPLYING THERMAL ENERGY TO THE HEATER OF A HOT-GAS ENGINE, AS WELL AS A HOT-GAS ENGINE COMPRISING A DEVICE FOR CARRYING OUT THE METHOD

This is a continuation of application Ser. No. 334,869, filed Feb. 22, 1973.

The invention relates to a method of supplying thermal energy to the heater of a hot-gas engine, as well as a hot-gas engine comprising a device for carrying out said method.

A hot-gas engine is to be understood to mean herein a device for converting calorific energy into mechanical energy in which a gaseous medium traverses a closed thermodynamic cycle and in which thermal energy is supplied from without to the said medium through the wall of a heater.

Hot-gas engines of the above-described type are known from "MTZ Motortechnische Zeitschrift" 29, nr. 7, July, 1968, FIG. 13.

As compared with internal combustion engines, said hot-gas engines have the advantage for example, that the gases of combustion are considerably cleaner, that is to say they contain in particular fewer carbon monoxides and unburnt hydrocarbons. As a result of this, the hot-gas engines are extremely suitable for use in places where air solution should be minimized. Such places are, for example, factory spaces and storage spaces, respectively, in which the engine is arranged stationary or is present as an energy source in vehicles, and mines in which the engine is used in vehicles as an energy source. Also included are cities with their great population concentrations and numerous vehicles producing gases which are detrimental to health.

In the known hot-gas engine, fuel and air of combustion are supplied to a burner device and react there. The gas mixture formed is conducted successively past a first heater part while giving off thermal energy, past at least one further heater part while likewise giving off thermal energy, and is then exhausted. Although the exhausted gas mixture is poor in detrimental gases of combustion it has been found to contain still a small quantity of nitrogen oxides. These nitrogen oxides are detrimental to health and may therefore not exceed a certain concentration in the atmosphere. This means that in order to keep the concentration of these oxides within bounds, the spaces in which the engine operates will have to be ventilated which, of course, is disadvantageous.

It is the object of the invention to provide a method of supplying thermal energy to the heater of a hot-gas engine, as well as a hot-gas engine comprising a device for carrying out said method, with which the quantity of nitrogen oxides in the exhaust gases can be further reduced.

The present invention is based on the recognition of the fact that the formation of nitrogen oxides increases strongly with the temperature at which the combustion takes place, as well as on the recognition of the fact that the combustion of the mixture air-fuel in the burner device takes place substantially adiabatically, as a result of which high reaction temperatures occur in the burner device. By ensuring that the temperatures at which combustion takes place do not increase too high, decrease of the quantity of nitrogen oxides in the exhaust gases can be obtained.

In order to realize the end in view, the method according to the invention is characterized in that a quantity of air of combustion which is smaller than the quantity which stoichiometrically corresponds to the supplied quantity of fuel is supplied to the burner device, air of combustion being supplied to the space between the first and the further heater part and reacting with the flowing gas mixture, the quantities of air of combustion supplied to the burner device and the space being furthermore chosen to be so that the gas mixture which is exhausted is at least substantially free from nitrogen oxides and other detrimental gases.

Within the scope of the present application, the term "the quantity of air of combustion which stoichiometrically corresponds to a quantity of fuel" should be understood to mean that quantity of air of combustion which contains a quantity of oxygen which is theoretically necessary for complete oxidation of the quantity of fuel. Since the quantity of air of combustion supplied to the burner device is smaller than the quantity stoichiometrically required for the quantity of supplied fuel, hardly any nitrogen oxides will be formed during the air-fuel reactions as a result of the comparatively low oxygen concentration. At the same time, less thermal energy is evolved during the combustion process which occurs substantially adiabatically resulting in lower reaction temperatures in the burner device, so that also the quantity of nitrogen oxides formed is smaller. The gas mixture leaving the burner device, subsequently supplies a part of its thermal energy to the first heater part as a result of which its temperature decreases. This gas mixture then reacts with the air of combustion supplied to the space situated between the first and the further heater part, as a result of which the temperature increases again. By suitable choice of the quantity of air of combustion supplied to the burner device and to the space situated between the first and the further heater part, it is achieved that the temperature in the said space lies at such a level that nitrogen oxides are substantially not formed in said space. The gas mixture which leaves said space and is further reduced in temperature by giving off thermal energy to the further heater part, then contains substantially no nitrogen oxides. By the method according to the invention it is also achieved that the gases of combustion which are poor in nitrogen oxides contain no further detrimental exhaust gases, such as unburnt hydrocarbons which have been supplied as fuel and carbon monoxides.

In a favourable embodiment of the method according to the invention, the fuel used is hydrogen. This presents the advantage that detrimental unburnt fuel residues are absent in advance, while the formation of nitrogen oxides is prevented by carrying out the combustion in the manner described.

The invention furthermore relates to a hot-gas engine comprising a heater and a device for supplying thermal energy to the heater according to the above-described method and which device comprises at least one burner device with which at least one inlet for fuel, at least one inlet for air of combustion and at least one outlet for smoke gas mixture communicate, said burner device communicating with an outlet duct via successively a first heater part, a space, and at least one further heater part.

The hot-gas engine according to the invention is characterized in that at least one further inlet for air of combustion is present which communicates with the space situated between the first and the further heater part.

It has been found that sometimes the exhausted gas mixture still contains a quantity of nitrogen oxides and unburnt hydrocarbons. This may be caused by too short a stay and too rapid a cooling of the gas mixture in the engine, so that there is insufficient opportunity for the adjustment of a complete chemical equilibrium between the gas components which pass the further heater part and are exhausted. In order to avoid this drawback, a favourable embodiment of the hot-gas engine according to the invention is characterized in that the space situated between the first and the further heater part has a volume in which the stay of the gas mixture in said space is sufficiently long to obtain an at least substantially complete chemical equilibrium of said gas mixture at the prevailing temperature level.

By sufficiently large dimensions of the space between the first and the further heater part, the stay of the flowing gas mixture in said space is consequently increased and at the prevailing lower temperature level in said space it is prevented that remaining nitrogen oxides and unburnt hydrocarbons, respectively, are incompletely reduced and oxidized, respectively.

A further favorable embodiment of the hot-gas engine according to the invention is characterized in that one or more catalysts are present which are arranged in the proximity of the said heater parts and/or in the proximity and on the walls, respectively, of the spaces in which the said heater parts are arranged.

Catalysts are known per se, for example, from Romp's book "Oil burning", pp. 147–149 (M. Nijhoff, Den Haag, 1937), and serve as an ignition mechanism or as an auxiliary means to stimulate the ignition and combustion of gas mixtures.

In the present case, however, the use of catalysts provides the additional advantage that the space between the first and the further heater part can have small dimensions since the chemical equilibrium between the components of the gas mixture flowing through said space is reached more rapidly by the catalytic action and therefore a shorter stay of the gas mixture in the said space will be sufficient.

In order that the invention may be readily carried into effect, two embodiments of the hot-gas engine according to the invention will now be described in greater detail, by way of example, with reference to the diagrammatic drawings which are not drawn to scale.

Reference numeral 1 in FIG. 1 denotes a cylinder in which a piston 2 and a displacer 3 can move with a phase difference. The piston 2 and the displacer 3 are connected to a driving mechanism (not shown) by a piston rod 4 and a displacer rod 5, respectively. A compression space 6 is present between the piston 2 and the displacer 3, while an expansion space 7 is present above the displacer 3. The compression space 6 and the expansion space 7 communicate with each other via a cooler 8, a regenerator 9, and a heater 10 with the engine's gaseous working medium cyclically heated when it flows through the heater parts 13, 14 and the upper parts of 12.

The heater 10 which is accommodated in a housing 11 is constructed from a number of pipes 12 which communicate at one end with the regenerator 9 and at the other end with an annular duct 13, and from a number of pipes 14 which communicate at one end with the annular duct 13 and at the other end with the expansion space 7.

A number of partitions 15 divide the space around the heater pipes into two partial spaces 16 and 17. Between the walls of the housing 11 and the heater 10 there is a space 18. The hot-gas engine comprises a burner device 19 with which an inlet 20 for fuel and an inlet 21 for air of combustion communicate. The burner device 19 communicates with the space 18 via the partial space 16, a first heater part constituted by the parts of the pipes 12 situated above the partitions 15, as well as by annular duct 13 and pipes 14, which space 18 in turn communicates with an outlet 22 for gases of combustion via a second heater part constituted by the lower parts of pipes 12, and via partial space 17. The space 18 furthermore comprises an inlet 23 for air of combustion. Combustion thus occurs initially in the space defined by burner 19 and the space 16; combustion gases from these spaces pass pipes 12 and 14 to space 18. Air via inlet 23 flows into space 18 to react (burn) with combustion gases in this space. Thus the space defined by burner 19 and the space 16 constitute an initial or primary combustion space, while space 18 constitutes a secondary combustion space.

The engine comprises a preheater 24 which communicates with the two inlets 21 and 23 for air of combustion via a common duct 25 and communicates with the outlet 22 for gases of combustion via a duct 26. In this preheater the gases of combustion can exchange heat with the air of combustion. A controllable fan 27 is present for sucking in air of combustion, while a distribution cock 28 is incorporated in the duct 25 to distribute the quantity of air of combustion sucked in by means of the fan between the two inlets 21 and 23.

The operation of the device is as follows. A quantity of air of combustion which is smaller than the quantity which stoichiometrically corresponds to the quantity of fuel supplied to the inlet 20 is supplied to the inlet 21. As a result of this hardly any nitrogen oxides are formed during the combustion reactions in the burner device 19 owing to the low oxygen concentration. Less thermal energy is also evolved during the combustion process which occurs substantially adiabatically, which results in lower temperatures in the burner device. The lower temperature level also ensures that substantially no nitrogen oxides are formed. The gas mixture formed in the burner device 19 then flows along the first above-described heater part while giving off thermal energy to it, and consequently its temperature drops. Then it flows into the space 18 and reacts there with the air of combustion supplied to said space via inlet 23 secondary means for supplying air. As a result of this, the temperature of the gas mixture rises. By suitable choice of the quantity of air of combustion supplied to inlet 23, complete combustion of the remaining fuel takes place at a temperature level in the space 18 which is such that the formation of nitrogen oxides does substantially not take place.

In order to achieve that, the components of the gas mixture which leaves the space 18 are in substantially complete chemical equilibrium and hence substantially no nitrogen oxides, hydrocarbons and other detrimental gases are present any longer in said space at the prevailing temperature level, the space 18 has large dimensions such that the stay of the gas mixture in said space is sufficiently long for adjusting said equilibrium. The gas mixture then flows along the second heater part constituted by the lower parts of the pipes 12, while giving off thermal energy to it, as a result of which the temperature of the mixture again decreases, and then the mixture flows through outlet 22 and duct 26 to the preheater 24 where it supplies in counter-flow with the sucked-in air thermal energy to the said air. The use of a preheater is not strictly necessary but extremely favourable to minimize the calorific losses.

Figure 2:
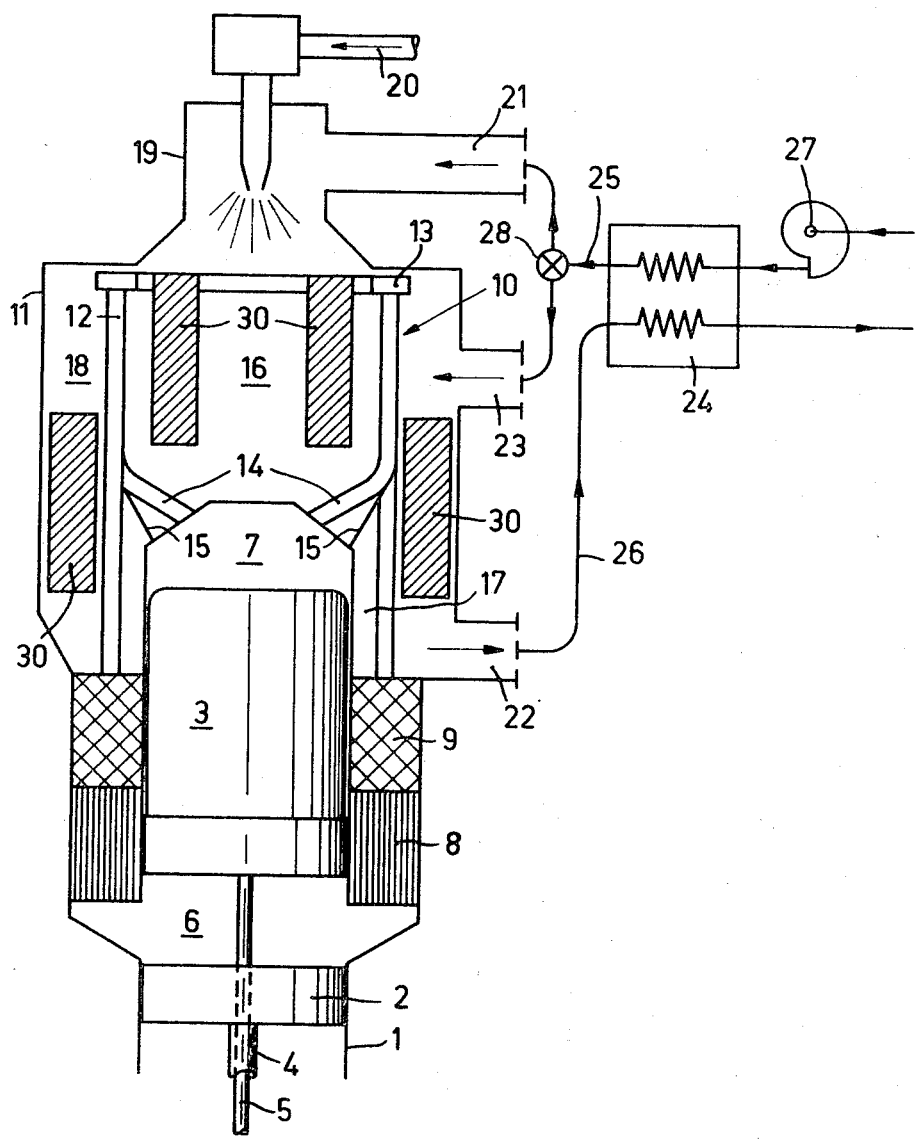

FIG. 2 shows a hot-gas engine which substantially entirely corresponds to that shown in FIG. 1. Therefore, corresponding components are referred to by the same reference numerals. The only difference is that in this embodiment catalysts, for example, consisting of finely divided platinum, are provided in the proximity of the heater in the space 18 and the partial space 16. The catalysts have a favourable influence on the combustion process, in particular in places where, owing to the comparatively low temperature (for example, the walls of the housing 11) there is a danger of incomplete combustion. As a result of the catalytic, reaction-accelerating action, the desirable chemical equilibrium is adjusted more rapidly between the components of the gas mixture in the space 18. So the required stay of the gas mixture in the said space is shorter. Therefore, the space 18 in this case is constructed to be smaller than in the hot-gas engine shown in FIG. 1, so that the present hot-gas engine as a whole has smaller dimensions.

Although in the embodiments of the hot-gas engines described each time only two heater parts are shown, it is naturally also possible to use several heater parts in which each time an inlet for air of combustion can be made to communicate with the space between two adjacent heater parts.

In addition to the embodiments shown in the drawings, many other constructions are possible, in which the system of combustion in steps with intermediate supply of thermal energy of the mixture can also be used.

What is claimed is:

1. In a hot gas engine including a housing, a burner for combustion of air and fuel producing combustion gases and a heater comprising a plurality of ducts for exchange of heat from said combustion gases to fluid medium flowing in said ducts, the improvement in combination therewith wherein said heater ducts are situated within said housing and define a first annular space surrounded by the ducts, a second annular space surrounding the ducts, and a third space axially adjacent said ducts, said first and third spaces comprising a primary combustion space, said second space comprising a secondary combustion space including a discharge outlet, said apparatus further comprising means for supplying to said primary combustion space fuel and a quantity of air which is stoichiometrically insufficient for complete combustion of the supplied fuel resulting in combustion at a temperature lower than the temperature of stoichiometric combustion, the apparatus further comprising secondary means for supplying air to said secondary combustion space for reaction with combustion gases that flow there from the primary combustion space, said heater ducts absorbing heat from and reducing the temperature of said combustion gas which flows past the ducts from the primary to secondary combustion spaces, said heat removal in combination with non-stoichiometric combustion ensuring that the temperature of said combustion gases remain below the corresponding stoichiometric temperature such that formation of nitrogen oxides is inhibited.

2. Apparatus according to claim 1 wherein said secondary combustion space is dimensioned to be sufficiently large relative to the quantity of combustion gas therein, such that combustion reactions in this secondary combustion space reach substantial chemical equilibrium generally adiabatically before exiting this space.

3. Apparatus according to claim 1 further comprising catalyst means situated in said primary combustion chamber in the proximity of said heater parts for stimulating ignition and combustion of said gas mixture.

4. Apparatus according to claim 1 wherein said primary combustion chamber has walls and wherein said catalyst means is situated in the proximity of certain of said walls.

5. Apparatus according to claim 1 wherein said catalyst means comprises finely divided platinum.

6. Apparatus according to claim 1 wherein said heater ducts comprise first and second parts, said first part being in the flow path of combustion gases from said primary to said secondary combustion chambers, said second part being in the flow path of combustion gases from said second combustion chamber to said outlet therefrom.

7. In a combustion engine including a housing, a burner for combustion of air and fuel producing combustion gases and a heater comprising a plurality of ducts for exchange of heat from said combustion gases to fluid medium flowing in said ducts, the improvement in combination therewith wherein said heater ducts are situated within said housing and define a first annular space surrounded by the ducts, a second annular space surrounding the ducts, and a third space axially adjacent said ducts, said first and third spaces comprising a primary combustion space, said second space comprising a secondary combustion space including a discharge outlet, said apparatus further comprising means for supplying to said primary combustion space fuel and a quantity of air which is stoichiometrically insufficient for complete combustion of the supplied fuel resulting in combustion at a temperature lower than the temperature of stoichiometric combustion, the apparatus further comprising secondary means for supplying air to said secondary combustion space for reaction with combustion gases that flow there from the primary combustion space, said heater ducts absorbing heat from and reducing the temperature of said combustion gas which flows past the ducts from the primary to secondary combustion spaces, said heat removal in combination with non-stoichiometric combustion ensuring that the temperature of said combustion gases remain below the corresponding stoichiometric temperature such that formation of nitrogen oxides is inhibited.

8. In a method of supplying thermal energy to the heater of a hot gas engine which engine includes a burner in a primary combustion chamber for combustion of fuel and air and heater ducts for exchanging thermal energy from combustion gas to fluid medium flowing in said ducts, the improvement in combination therewith comprising the steps: supplying to said burner a quantity of fuel, supplying to said burner a quantity of air which is stoichiometrically insufficient for complete combustion of the supplied fuel, igniting and burning said fuel and air in incomplete combustion forming combustion gases at a temperature lower than the temperature of combustion gases formed in stoichiometric combustion, flowing said combustion gases past and in contact with said ducts for transferring thermal energy from said gases to said fluid flowing within said ducts and thereby reducing the temperature of said gases, and thence flowing said gases into a secondary combustion chamber for continuing oxidation thereof, supplying to said secondary combustion chamber air in quantity sufficient for complete combustion of said gases therein, providing said second combustion chamber with volume sufficiently large to allow the expansion of said combustion gas therein to reach chemical equilibrium substantially adiabatiacally, and flowing said products of combustion in said secondary chamber past and in contact with said heater ducts for further transferring thermal energy thereto.

9. A method according to claim 8 comprising the further step of providing catalyst means in said primary combustion chamber and thereby stimulating ignition and combustion of said gas and air.

* * * * *

PO-1050
(5/69)

UNITED STATES PATENT OFFICE
CERTIFICATE OF CORRECTION

Patent No. 3848412          Dated Nov. 19, 1974

Inventor(s) ALBERTUS PETER JOHANNES MICHELS ET AL

It is certified that error appears in the above-identified patent and that said Letters Patent are hereby corrected as shown below:

In the Title:

The Foreign Application Priority Data number should read --7003200--

Signed and sealed this 22nd day of April 1975.

(SEAL)
Attest:

RUTH C. MASON
Attesting Officer

C. MARSHALL DANN
Commissioner of Patents
and Trademarks